United States Patent [19]
Aulich et al.

[11] 4,355,863
[45] Oct. 26, 1982

[54] CLADDED OPTICAL FIBER HAVING A LONGITUDINAL SIDE COUPLING ZONE

[75] Inventors: Hubert Aulich; Franz Auracher, both of Munich, Fed. Rep. of Germany

[73] Assignee: Siemens Aktiengesellschaft, Berlin & Munich, Fed. Rep. of Germany

[21] Appl. No.: 944,366

[22] Filed: Sep. 21, 1978

[30] Foreign Application Priority Data

Sep. 30, 1977 [DE] Fed. Rep. of Germany ....... 2744129

[51] Int. Cl.³ .............................................. G02B 5/172
[52] U.S. Cl. .................................................. 350/96.15
[58] Field of Search ........................... 350/96.15, 96.16

[56] References Cited

U.S. PATENT DOCUMENTS

| | | | |
|---|---|---|---|
| 2,506,672 | 5/1950 | Kell | 350/96.15 |
| 3,777,149 | 12/1973 | Marcatili | 350/96.15 |
| 4,021,097 | 5/1977 | McMahon | 350/96.15 |
| 4,087,156 | 5/1978 | Kao et al. | 350/96.15 |
| 4,103,154 | 7/1978 | d'Auria et al. | 350/96.15 |
| 4,136,929 | 1/1979 | Suzaki | 350/96.15 |
| 4,240,694 | 12/1980 | Pan | 350/96.16 |

OTHER PUBLICATIONS

C. Stewart et al., "Directional Couplers for Optical Fibre Communication Systems", Proceedings 3rd European Conf. on Optical Communications, Sep. 1977.
T. Ozeki et al., "Optical Directional Coupler Using Tapered Sections in Multimode Fibers", *App. Phys. Letts.*, vol. 28, No. 9, May 76, pp. 528–529.
Aulich et al., "High-Aperture, Medium-Loss Alkali-–Lead Silicate Fibers Prepared by the Double Crucible Technique", *Optical Meeting on Optical Fiber Transmission*, Feb. 1977, Williamsburg, Virginia, pp. TuC5-1 to TuC5-4.

*Primary Examiner*—John D. Lee
*Attorney, Agent, or Firm*—Hill, Van Santen, Steadman, Chiara & Simpson

[57] ABSTRACT

An optical fiber having a core surrounded by a cladding layer which has an index of refraction less than the index of refraction of the core characterized by a longitudinal side coupling zone being formed by a longitudinal opening extending through the cladding layer of the fiber to expose a portion of the core. The optical fiber of the invention is particularly useful in conjunction with a light sensitive detector and is useful in a mixer where more than one fiber are joined together either in a bundle or in a strip configuration. The fiber with the side coupling zone can be formed by drawing the fiber from a workpiece having a core or rod member surrounded by a sleeve member or layer which is provided with the opening or can be drawn from a molten material utilizing a double crucible in which the opening of the inner crucible is provided with at least one bulge extending to the edge of the opening of the outer crucible.

2 Claims, 6 Drawing Figures

CLADDED OPTICAL FIBER HAVING A LONGITUDINAL SIDE COUPLING ZONE

BACKGROUND OF THE INVENTION

The present invention is directed to a cladded optical fiber having at least one longitudinal side coupling zone which is intended for lateral input and output coupling of light into and out of the fiber which has a glass core surrounded by a glass layer forming the cladding layer which cladding layer has an index of refraction lower than the index of refraction of the core so that a jump or step in the index of refraction occurs at the boundary surface between the core and cladding layer.

Optical glass fibers having a core surrounded by a cladding are known and the provision of longitudinal side coupling zones in such a fiber is also known. In an article by T. Ozeki and B. S. Kawasaki, "Optical Directional Coupler Using Tapered Sections In Multi-Mode Fibers", *Applied Physics Letters*, Vol. 28, No. 9, May 1, 1976, ppg. 528–529, a coupling zone between a plurality of fibers was formed by a local constriction of the cladded optical fiber so that the core diameter and casing diameter is reduced in comparison to the diameter of the remainder of the fiber. Glass fibers of this kind are used in a mixer in which a plurality of the fibers are joined together at the constriction in an attempt to achieve as dense as possible packing. However, an increasing number of fibers will impede a dense packing because the difference between the diameter of the group in the coupling zone and the diameter of the group outside of the coupling zone rapidly increases and the outermost fibers of the coupling zone are subjected to a greater deflection at the coupling zone. Since the bending stability and the drawing stability of an individual fiber is subjected to certain limits particularly at the constriction, the number of fibers which can be packed together is limited.

SUMMARY OF THE INVENTION

The present invention is directed to providing an optical glass fiber having a core surrounded by a cladding which has an index of refraction lower than the index of refraction of the core. The fiber has at least one longitudinal side coupling zone and can be packed with a large number of similar fibers with a good density in a mixer.

To accomplish these aims, an optical fiber for light conducting purposes having at least one longitudinal side coupling zone, which is intended for lateral input and output coupling of light into and out of the fiber, said fiber comprising a glass core surrounded by a glass layer forming a cladding layer, said cladding layer having an index of refraction lower than the index of refraction of the core so that a step in the index of refraction occurs at the boundary between the core and the cladding layer has the improvement comprising each coupling zone being formed by an opening extending through the cladding layer of the fiber to expose a portion of the core. Due to the opening in the cladding layer, light can be input coupled into and output coupled from the core of the fiber. The strength of the input coupling and the output coupling can be determined by the area of the opening. Constrictions of the fiber in the coupling zone are no longer necessary.

An advantageous embodiment of the glass fiber is characterized in that the opening consists of a longitudinal slot. Here the degree of the input coupling and the output coupling can be determined solely by the length of the fiber and by the length of the longitudinal slot.

The optical fiber is particularly useful when incorporated in a mixer with other fibers. The mixer may have the fibers arranged in a bundle or in a row.

The optical fiber is also useful in an arrangement with a photo or light sensitive detector which is arranged adjacent the coupling zone. The arrangement can have either a single detector or a pair of detectors.

The optical glass fiber of the present invention can be produced advantageously by a double crucible device comprising at least one drawing nozzle wherein the opening in the inner crucible which is arranged concentric to the opening in the outer crucible is provided for each opening in the cladding layer with a bulge, which extends at least to the edge of the opening of the outer crucible. This device can be used to produce glass fibers provided with coupling zones in the manner of conventional formation of glass fibers drawing from a double crucible without any additional operational steps.

In another advantageous process for the production of the glass optical fiber provided with the coupling zone, which is an opening in the cladding layer, is characterized in that a workpiece having a rod member telescopically received in a sleeve-like or tube-like layer, which has at least one opening to expose a portion of the rod member. The workpiece is subsequently heated to a drawing temperature and then drawn into the fiber having a cladding layer with a longitudinal extending opening exposing a portion of the core. The provision of the workpiece can be accomplished by providing a tube composed of the glass material for the cladding layer providing a rod member consisting of the glass for the core, forming at least one longitudinal extending opening in the tube, assemblying the rod member within the tube and fusing the tube and rod member together at one end to form the workpiece. In addition, a workpiece comprising the rod member assembled within a tubular member can have portions of the tubular member removed to form the openings therein.

The glass optical fibers of the present invention can be packed extremely densely in arbitrary number and are favorably priced and simple to produce. These fibers possess a high degree of stability and can be used to produce glass fiber branches, distributors, directional couplers and mixers in optical communication transmission systems in particular with multi-mode glass fibers.

BRIEF DESCRIPTION OF THE DRAWINGS

FIG. 5b is a cross-sectional view taken along line Vb-Vb of FIG. 5a;

FIG. 6b is a cross-sectional view taken along line VIb-VIb of FIG. 6a;

FIG. 7b is a plan view of the inner crucible illustrated in FIG. 7a; and

DESCRIPTION OF THE PREFERRED EMBODIMENTS

Figure 1:
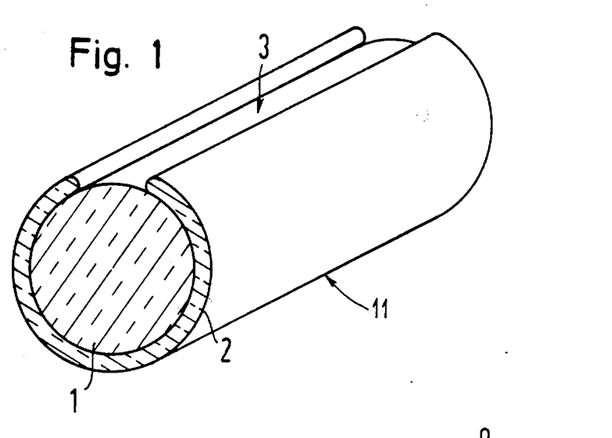
FIG. 1 is a perspective view with portions in cross section of an optical fiber in accordance with the present invention.

The principles of the present invention are particularly useful in providing an optical fiber or light conductor generally indicated at 11 in FIG. 1. The optical fiber 11 has a core 1, which is substantially surrounded by a layer of cladding material 2 except for an opening 3 in the layer which is illustrated as the longitudinal slot 3 which exposes a portion of the core. The longitudinal slot 3 forms a longitudinal side coupling zone so that the fiber 11 can be used, for example, in a long glass optical fiber or light conductor as a coupling component. For example, the fiber 11 can be interposed between two normal fibers and connected thereto to form a coupling zone for the combination.

It should be pointed out that the core 1 has a glass material with an index of refraction which is higher than the index of refraction of the glass material forming the layer 2. Therefore, at the boundary between the layer 2 and the core 1, there is a step down in the index of refraction.

Figure 2:
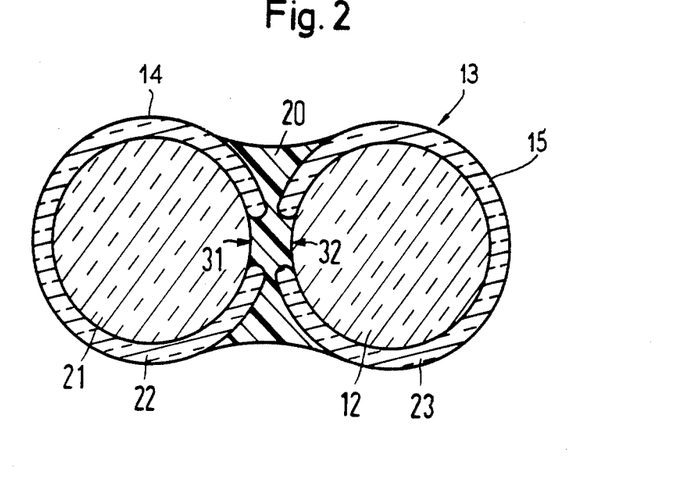
FIG. 2 is a transverse cross section of a mixer having two optical fibers in accordance with the present invention.

In FIG. 2, a mixer generally indicated at 13 is composed of two optical fibers 14 and 15 each of which has substantially the same structure as the fiber 11 of FIG. 1. As illustrated, the fiber 14 has a core 21 surrounded by a cladding layer 22 with an opening or gap which forms a coupling zone 31 and the fiber 15 has a core 12 surrounded by a cladding layer 23 provided with a gap or an opening to form a longitudinal coupling zone 32. The fibers 14 and 15 are disposed or arranged so that the coupling zones 31 and 32 are axially aligned with respect to the axes of the fibers, lie opposite one another and are in face-to-face relationship. To join the two fibers 14 and 15 together, a connection of light transmissive adhesive 20 is provided and this adhesive may be a casting resin and fills the entire interspace between the two fibers. The index of refraction of the adhesive material 20 must exceed the index of refraction of the casings or cladding layers 22 and 23. This applies generally to the following arrangements in which adhesive materials are used.

Figure 3:
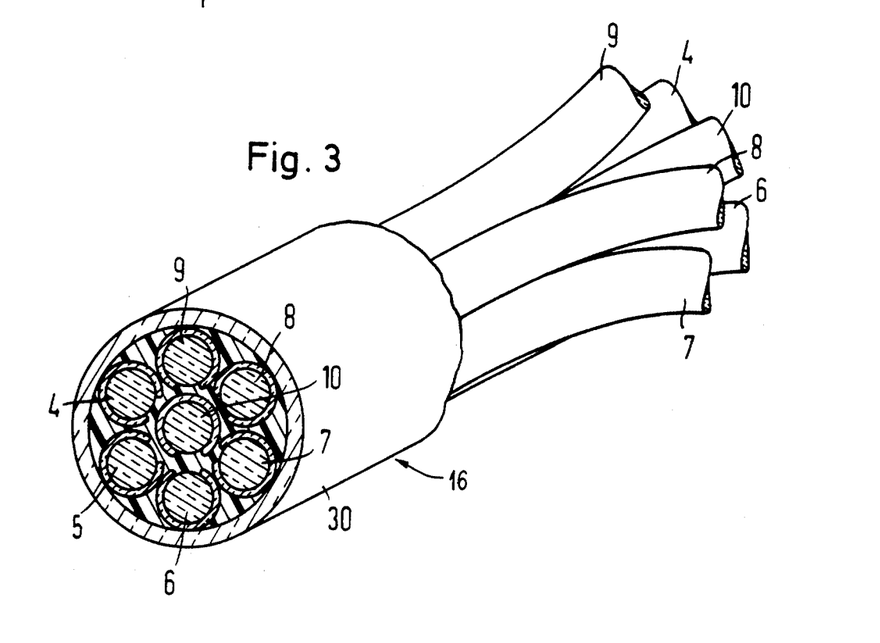
FIG. 3 is a perspective view with portions in cross section for purposes of illustration of a mixer utilizing the optical fibers in accordance with the present invention arranged in a bundle.

In FIG. 3, a mixer generally indicated at 16 is illustrated. The mixer 16 is composed of a plurality of cladded optical fibers 4–10, which are arranged in a bundle and are each provided with a longitudinal coupling zone formed by an opening in the cladding so that a portion of the core is exposed. The remainder of each of the fibers 4–10 has a conventional cladding layer which completely surrounds the core. The fibers are arranged with their coupling zones axially aligned with one another and are caused to adhere to one another by means of a light transmissive adhesive which, as in the previously described embodiments, is greater than the indices of refraction of the casing or cladding material. As illustrated, the fibers 4–9 are arranged around the fiber 10. The coupling zone of the fibers 6 and 10 lie opposite to one another. In itself, it would be adequate to connect the fibers by the adhesive. However, it is expedient that prior to applying the adhesive, the fibers be introduced into a glass capillary tube 30, whose index of refraction is at a maximum equal to the lowest index of refraction prevailing in the group of fibers. Then the group of fibers 4–10 with the capillary tube 30 are cast with the casting resin or adhesive. The light emerging from a slot or zone in one fiber will then be distributed over the entire cross section of the group of light conductors or fibers and then passes through the slots in the other light conductors or optical fibers into their cores where it is, for the main part, transmitted. It is also expedient to strand or twist the group of fibers 4–10. The light conductors or fibers can also be fused to one another, if desired.

Figure 4:
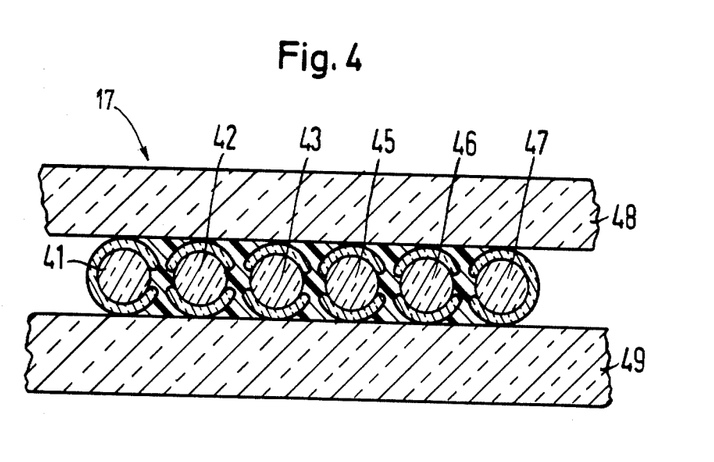
FIG. 4 is a cross-sectional view of a plurality of the optical fibers in accordance with the present invention arranged to form a mixer having a flat or strip form.

Another embodiment of a mixer is generally indicated at 17 in FIG. 4. The mixer 17 is a type of mixer in a flat or strip form. As illustrated, the mixer includes glass fibers 41–47 which are arranged beside one another in one plane. The outermost fibers 41 and 47 are each provided with a single zone provided by a single longitudinal slot or opening in the cladding layer. The interior fibers 42–46 are each provided with two perpipherally spaced coupling zones, which are formed by two peripherally spaced slots in the cladding layer. As illustrated, the fibers are arranged so that each fiber has a coupling zone facing a coupling zone of each adjacent fiber. Thus, the fiber 42 has a coupling zone, which is facing the coupling zone of the fiber 41 and also a coupling zone facing the coupling zone of fiber 43, which, in turn, also has a coupling zone facing a coupling zone of the fiber 45. The optical fibers 41–47 are arranged between the two glass plates 48 and 49 whose index of refraction may not exceed the lowest index of refraction prevailing in part of any of the glass fibers. The interspaces between the glass fibers are again filled with an adhesive material, for example, the casting resin whose index of refraction must exceed the indices of refraction of the cladding layers. By means of the flat or strip design, a particularly low-loss coupling is achieved as the coupling zones lie directly opposite one another.

Figure 5A:
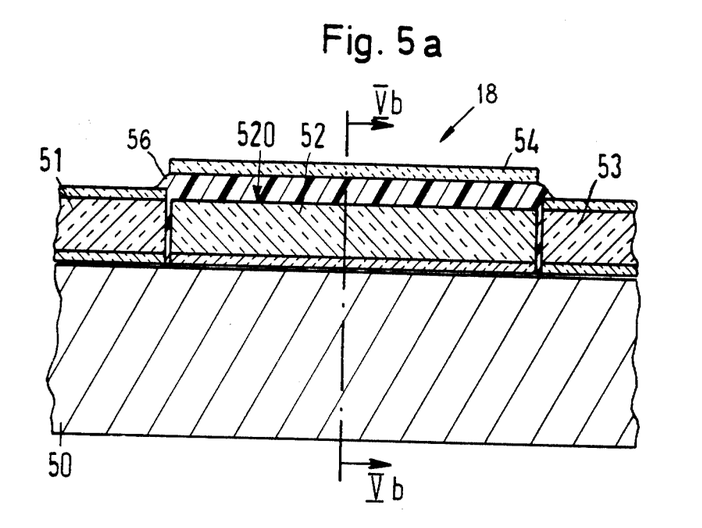
FIG. 5a is a longitudinal cross-sectional view taken along line Va-Va of FIG. 5b of an optical fiber or light conductor in accordance with the present invention arranged with a light sensitive detector.
Figure 5B:
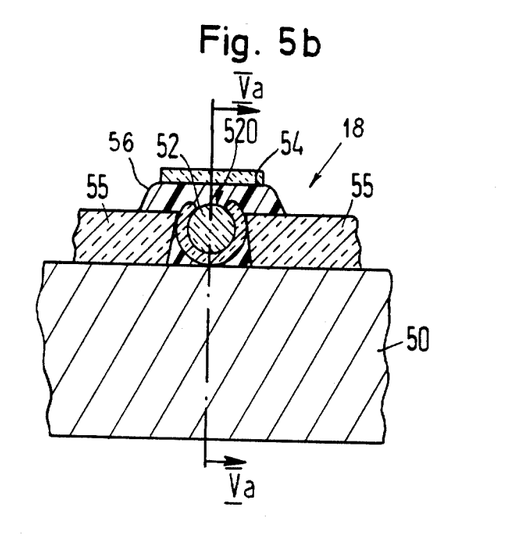

In an arrangement generally indicated at 18 in FIGS. 5a and 5b, a glass fiber 52 has a detector 54 positioned adjacent a coupling zone 520. As illustrated, the arrangement 18 includes substrate 50 consisting of, for example glass or silicon. Arranged on the substrate 50 is a glass fiber combination including two conventional cladded optical glass fibers 51 and 53 with a central component 52 disposed therebetween to provide the coupling zone 520. The light sensitive detector 54 is arranged above the coupling zone. The fixing of the fibers upon the substrate 50, which preferably consists of glass, and has an index of refraction which may not exceed the lowest index of refraction of a part of the fibers, is affected by means of a fiber guide 55 (FIG. 5b) applied to the substrate 50. This fiber guide 55, which preferably possesses an undercut profile, can be produced photolithographically in light sensitive foils, for example, foils sold under the trademark RISTON by DuPont or by directional selective (preferential) etching of a silicon wafer. The former is particularly suitable for the production of an undercut profile. The fixing of the detector 52 is preferably carried out by an adhesive or casting resin 56.

Figure 6A:
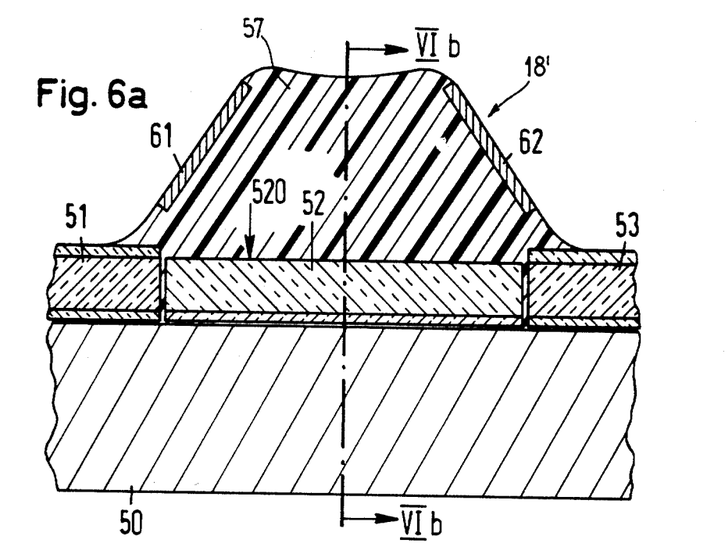
FIG. 6a is a cross-sectional view taken along line VIa-VIa of FIG. 6b of an arrangement comprising an optical fiber in accordance with the present invention arranged with two detectors.
Figure 6B:
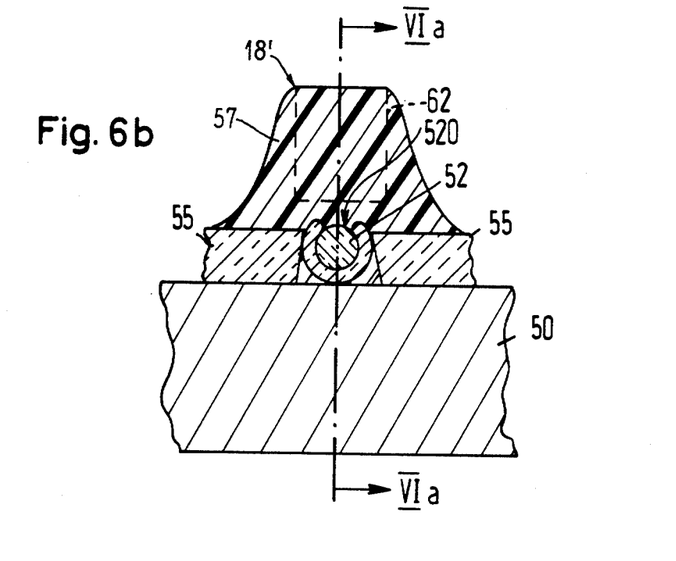

An embodiment of the arrangement 18 is generally indicated at 18' in FIGS. 6a and 6b. The arrangement 18' again includes three glass fibers 51, 52 and 53 which are disposed on the substrate 50 with the central fiber 52 being provided with a light coupling zone 520. The arrangement 18' differs from the previous arrangement 18 by having two light sensitive detectors 61 and 62 which are arranged above the coupling zone 520. As illustrated, each of the detectors 61 and 62 lie in a separate plane, which extends at a slanting angle to the axis of the optical fiber combination formed by the fibers 51, 52 and 53. The detector 62 mainly receives light coming from the left or from fiber 51 and the detector 61 mainly receives the light coming from the right or the glass fiber 53. As in the previous arrangement 18, the detectors 61 and 62 are held in their desired angular relationship relative to the coupling zone 520 by an adhesive 57.

Figure 7A:
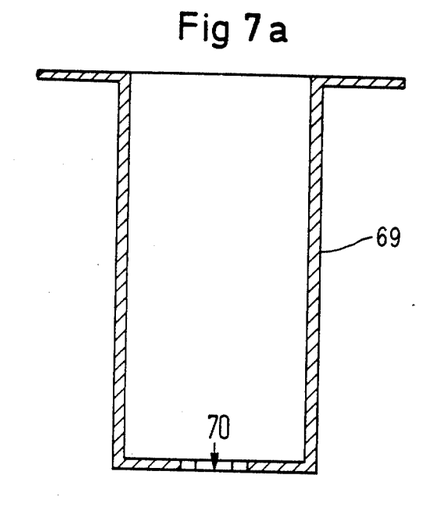
FIG. 7a is a longitudinal cross-sectional view through the axis of an inner crucible for use with a double crucible arrangement illustrating the improvement for producing the optical fiber of the present invention.
Figure 7B:
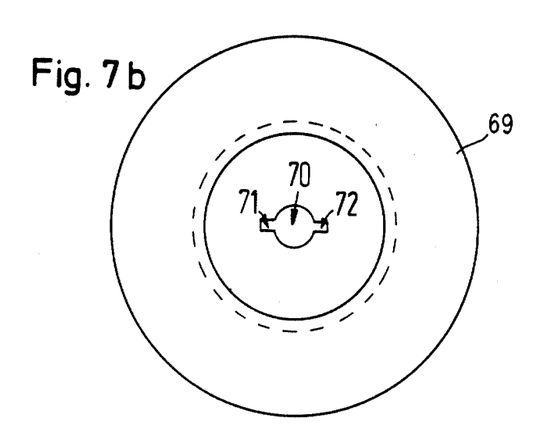

In order to produce an optical fiber such as 11 in FIG. 1, various processes may be followed. Three processes which are described hereinafter are examples of preferable embodiments of the processes for production of the proposed cladded light conducting optical fiber, which is provided with at least one longitudinal side coupling zone. The first of these production processes employs a double crucible method. Here, the glass fibers are produced in a double crucible device provided with at least one drawing nozzle, wherein the opening in the inner crucible, which is arranged concentric to an opening in the outer crucible, possesses at least one bulge which extends at least to the edge of the opening of the outer crucible. As illustrated, an example of the modifications of an inner crucible is generally indicated at 69 in FIGS. 7a and 7b. The inner crucible 69 has an opening 70 which, as illustrated in FIG. 7b, is provided with two bulges 71 and 72. The crucible can be used to produce a light conductor having two longitudinal slots arranged opposite one another as illustrated by the fibers such as 42, 43, 45 and 46 of FIG. 4. Generally speaking, it is true to say that one bulge may be provided for each slot which is to be produced. Thus, it is also possible to produce glass fibers having a plurality of openings or slots circumferentially spaced around the periphery of the cladding layer.

The drawing process is carried out by a known double crucible method. An example of such a process is explained and described in an article by H. Aulich, J. Grabmaier, K. H. Eisenrith and K. Kinshofer, "High-Aperture, Medium-Loss Alkali-Leadsilicate Fibers Prepared By A Double Crucible Technique", *Topical Meeting On Optical Fiber Transmissions*, Feb. 22-24, 1977, Williamsburg, Va., U.S.A., pp. TuC5-1 to TuC5-4.

The known double crucible method employs two crucibles which are arranged concentric within one another and the bases of which are provided with a nozzle. The nozzle is composed of two openings, namely an inner opening of a smaller diameter in the inner crucible and one having a larger diameter in the outer crucible. Both of the crucibles are composed of an alloy of platinum-rhodium composed of 90% platinum and the remainder rhodium. The central axis of the opening in the inner crucible which, for example, possesses a diameter of 4 cm coincides with the central axis of the opening in the outer crucible which, for example, possesses a diameter of 6 cm, and the distance between the bases of crucibles is set, for example at 2 mm. The outer crucible is filled with a melt of a glass material for the cladding layer and the inner crucible with a melt of the glass for the core. Both of the melts in the inner and outer crucible are at approximately 700° C. and a light conducting optical fiber can then be drawn from the crucible and possesses a core diameter of 100 μm with an overall diameter of 120 μm.

Another method of producing the optical fiber of the present invention is the rod and tube method. Here, at least one opening, for example a longitudinal slot is produced, for example, by using a diamond saw, in a wall of a commercially available tube composed of the glass material for the cladding layer. Subsequently, the tube with the longitudinal slot or opening is cleansed with a diluted hydrofluoric acid and distilled water. The width of the slot can be determined, for example, by the thickness of the blade of the diamond saw and can be easily varied in this manner. Now a cleansed glass rod composed of the glass material for the core of the fiber is telescopically inserted into the glass tube, which has been provided with the slot or opening, and the tube is fused, for example, at one end to the glass tube to form a workpiece for subsequent drawing. This rod-tube combination workpiece is now clamped in a fiber drawing device and conducted several times through a heating zone of the drawing furnace which is set at a temperature of approximately 500° C. These passes are to eliminate any absorbed moisture from the boundary areas between the rod and tube which would otherwise lead to the formation of bubbles during the drawing of the fiber and thus to high scattering losses in the fiber. This process also requires all the precautionary measures generally required in the drawing of a rod and tube workpiece into a fiber. Following the drying process, the temperature is increased to a value suitable for fiber drawing and the rod and the tube workpiece is drawn to form a fiber in a known manner.

In practical experiments, a glass tube of an AR-type produced by Schott Company and having an internal diameter of 10 mm and an outer diameter of 12 mm with an index of refraction of 1.516 is used. This tube is provided with a slot having a length of 50 cm by using a diamond saw which has a blade width or thickness of approximately 1 mm. A lead glass rod of the type F-7 produced by Schott Company is used as the fiber core material. Following the cleaning of the tube and of the glass rod member, which has a diameter of approximately 10 mm and an index of refraction of 1.62, the workpiece composed of the rod telescopically receiving the tube is drawn at a temperature of approximately 700° C. to form a glass length conductor or glass optical fiber having a thickness of approximately 140 μm with a slot in the cladding layer to form a coupling zone.

Figure 8:
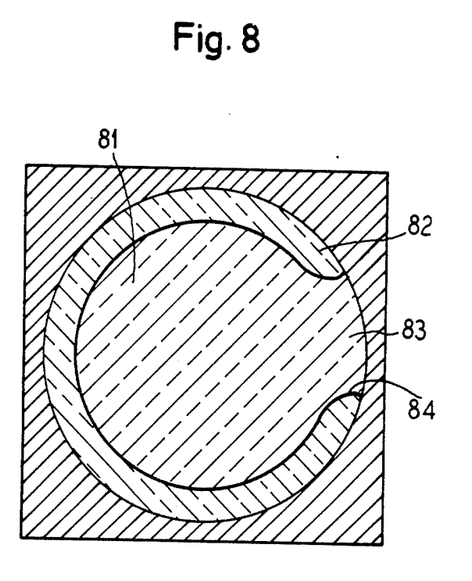
FIG. 8 is an enlarged cross-sectional view through an optical fiber in accordance with the present invention.

The temperature and drawing speed can be selected to be such that the slot is entirely filed with the core material. In FIG. 8, a cross section through a fiber produced in this way is illustrated. The core 81 has a portion 83 which extends into the gap 84 in the casing or cladding layer 82. With this type of fiber, a simple input coupling and output coupling of a light signal can be achieved in a specific application.

Another advantageous production process is based upon a fiber blank or workpiece composed of a rod member of the glass material for the core telescopically received in a sleeve or layer of glass for the cladding layer. The glass sleeve is provided with an opening or slot. To provide the sleeve, the workpiece may have the opening cut or formed in the sleeve by sawing, etching or melting, for example by means of a laser, either parallel with the axis of the workpiece or at angles to the axis of the workpiece. It is decisive in all cases that the glass casing is removed in a precisely defined manner at specific points along the length of the workpiece so that during the subsequent fiber drawing process, a light conducting optical fiber having the desired coupling zones are obtained. This process has the special advantage that the fibers, which are provided, may have locally separated longitudinal side coupling zones and are not provided with a slot or opening extending along the entire length of the fiber. Thus, the position of each of the longitudinal coupling zones can be extremely well defined. This is extremely useful in producing a one piece optical fiber, which has a conventional cladding yet is provided with a section having a longitudinally positioned coupling zone. For example, the three piece combination of FIGS. 5a and 6a, can be produced as a single one piece unit.

While the above-mentioned fiber workpieces were produced by telescopically assemblying a rod member in a tubular sleeve, the cladding sleeve can be produced by chemical vapor deposition of the cladding material into a rod member. Thus, the workpiece can be a rod member with a sleeve-like layer of the cladding material.

Although various minor modifications may be suggested by those versed in the art, it should be understood that we wish to embody within the scope of the patent warranted hereon, all such modifications as reasonably and properly come within the scope of our contribution to the art.

We claim:

1. In a mixer composed of a plurality of optical fibers with each of the optical fibers having a core surrounded by a cladding layer of glass with an index of refraction lower than the index of refraction of the core so that a step occurs at the boundary of said cladding layer and core, the improvements comprising a plate, a plurality of fibers arranged beside one another in a row on said plate with said row having a pair of outermost fibers with the interior fibers being positioned therebetween, a second plate covering said row, and a light transmissive adhesive having an index of refraction exceeding the index of refraction of the cladding layer filling any interspaces between the fibers and said first and second plates, each of the fibers having at least one longitudinal opening in the cladding layer to expose a portion of the core to form a coupling zone facing a coupling zone of an adjacent interior fiber and each interior fiber having a pair of peripherally spaced coupling zones facing coupling zones of adjacent fibers.

2. In a mixer according to claim 1, wherein the glass fibers and plates are secured to one another by means of the light transmissive adhesive.

* * * * *